United States Patent
Hoeppner et al.

(10) Patent No.: US 7,832,771 B2
(45) Date of Patent: Nov. 16, 2010

(54) METHOD FOR THE PRODUCTION OF A BOOK-TYPE SECURITY DOCUMENT AND A BOOK-TYPE SECURITY DOCUMENT

(75) Inventors: Harald Hoeppner, Berlin (DE); Michael Radtke, Berlin (DE); Detlef Märtens, Berlin (DE); Manfred Paeschke, Basdorf (DE); Jens Ehreke, Berlin (DE); Thomas Löer, Berlin (DE); Rainer Seidel, Berlin (DE); Michael Knebel, Berlin (DE)

(73) Assignee: Bundesdruckerei GmbH, Berlin (DE)

( * ) Notice: Subject to any disclaimer, the term of this patent is extended or adjusted under 35 U.S.C. 154(b) by 1005 days.

(21) Appl. No.: 10/590,091

(22) PCT Filed: Feb. 4, 2005

(86) PCT No.: PCT/EP2005/001110
§ 371 (c)(1),
(2), (4) Date: Aug. 21, 2006

(87) PCT Pub. No.: WO2005/090091
PCT Pub. Date: Sep. 29, 2005

(65) Prior Publication Data
US 2007/0182154 A1    Aug. 9, 2007

(30) Foreign Application Priority Data
Feb. 20, 2004    (DE) .................. 10 2004 008 840

(51) Int. Cl.
*B42D 15/00*    (2006.01)
*B42D 1/00*    (2006.01)
*B42D 15/10*    (2006.01)
*G09C 3/00*    (2006.01)

(52) U.S. Cl. .............. 283/70; 281/15.1; 283/63.1; 283/72; 283/75; 283/83; 283/112; 283/901

(58) Field of Classification Search .............. 235/492, 235/487; 283/117, 63.1, 61, 107–110, 112, 283/81, 74, 75, 904, 72, 83, 901; 340/572.1, 340/572.7, 572.8; 156/196, 211, 227, 250, 156/253, 256, 298, 299, 300, 343; 428/67, 428/76; 281/15.1
See application file for complete search history.

(56) References Cited

U.S. PATENT DOCUMENTS 2,588,067 A    3/1952    Whitehead (Continued)

FOREIGN PATENT DOCUMENTS

DE    197 11 343 A1    9/1998

(Continued)

OTHER PUBLICATIONS

Printout of definition of "booklet" from www.merriam-webster.com.

(Continued)

*Primary Examiner*—Dana Ross
*Assistant Examiner*—Justin V Lewis
(74) *Attorney, Agent, or Firm*—Kriegsman & Kriegsman (57) ABSTRACT

The invention relates to a method for the production of a security document in addition to a security document comprising at least one security cambric (15) and at least one transponder unit (21) which is fully encompassed by laminated layers (22,23) forming a laminated layer sheath.

18 Claims, 6 Drawing Sheets

U.S. PATENT DOCUMENTS

| | | | |
|---|---|---|---|
| 3,566,521 A | | 3/1971 | Connor |
| 3,601,913 A | | 8/1971 | Pollock |
| 4,243,458 A | * | 1/1981 | Giulie .................... 156/247 |
| 4,545,838 A | | 10/1985 | Minkus et al. |
| 5,211,424 A | * | 5/1993 | Bliss ..................... 281/15.1 |
| 5,528,222 A | * | 6/1996 | Moskowitz et al. ...... 340/572.7 |
| 5,590,912 A | * | 1/1997 | Stevens .................. 283/56 |
| 6,111,506 A | * | 8/2000 | Yap et al. ................ 340/572.1 |
| 6,135,503 A | | 10/2000 | Lob et al. ................ 283/63.1 |
| 6,213,702 B1 | * | 4/2001 | Wesselink ................ 412/1 |
| 7,040,981 B2 | * | 5/2006 | Iliescu et al. ............. 462/55 |
| 7,309,017 B2 | * | 12/2007 | Zaba et al. ............... 235/487 |
| 7,360,712 B2 | * | 4/2008 | Trantoul et al. ........... 235/492 |
| 2002/0170973 A1 | * | 11/2002 | Teraura ................... 235/492 |
| 2003/0057286 A1 | * | 3/2003 | Yamagishi et al. .......... 235/492 |
| 2003/0168514 A1 | * | 9/2003 | Rancien et al. ............ 235/492 |

FOREIGN PATENT DOCUMENTS

| | | | |
|---|---|---|---|
| EP | 0364730 | * | 9/1989 |
| GB | 2082505 A | * | 3/1982 |
| WO | WO 96/10803 A1 | | 4/1996 |
| WO | WO 9819870 | * | 5/1998 |
| WO | WO 9819870 A1 | * | 5/1998 |
| WO | WO 03100721 | * | 4/2003 |

OTHER PUBLICATIONS

Printout of definition of "pamphlet" from www.merriam-webster.com.

* cited by examiner

METHOD FOR THE PRODUCTION OF A BOOK-TYPE SECURITY DOCUMENT AND A BOOK-TYPE SECURITY DOCUMENT

The invention relates to a method for the production of a book-type security document and to a book-type security document, especially a passport book.

A book-type security document, such as for example a passport or the like, comprises a book block and a passport card which are connected with each other before these are connected with a book cover to a passport book. The book block is produced of a paper or a paper-like material which comprises security characteristics. The passport card comprises a multitude of security elements and in the case of a passport, the book block is personalized, matching the passport card.

There is considerable interest in protecting book-type security documents against forgeries and to make the production of forgeries technically impossible or at least uneconomical. Moreover, easy verifiability and checkability of intermediate products for book-type security documents or for security documents themselves should be rendered possible.

From EP 0 784 829 B1, a carrier arrangement is known for mounting into a contactless chip card. This carrier arrangement comprises a transponder unit which is designed, for example, with a semiconductor chip and an antenna coil connected with it. These transponder units are suitable for the contactless operation of chip cards. The energy required for the operation is transmitted in a general form by means of electromagnetic waves from a terminal to the chip card. Data communications between the terminal and the chip card are also provided in this manner. Characteristics can thus be stored in the transponder unit.

This carrier arrangement presents a so-called pre-laminate which is suitable for further processing in a chip card.

From DE 197 11 343 A1, a plastic card with individual visual information is known in which a photographic layer is applied for personalization. This photographic layer is applied on a carrier which is laminated over on one side by a laminated layer, with the contacts of the card chip being left free from the covering over by the laminate.

The invention is based on the objective of providing an economical and forgery-proof method for the production of security documents, as well as of providing a security document which enables contactless storage for security characteristics of the security document, data of the security document and personal data of the owner of the security document, for example, biometric characteristics.

According to the invention, this problem will be solved by a method according to the characteristics of claim 1, as well as by a security document according to the characteristics of claim 20.

The method for the production of a security document according to the invention, with at least one security cambric and at least one transponder unit which is fully encompassed by the laminated layers and forming a laminated layer sheath, has the advantage that a unit will be created which is difficult to forge. In the contactlessly operable transponder unit, encoded information or security characteristics of the security document can be stored, as well as data of the security document and personal data of the owner of the security document, such as biometric characteristics, for example. Thus, security characteristics can be provided randomly coordinated with each other or redundantly, with the laminated layer sheath providing at least mechanical protection. Moreover, the at least one security cambric and the at least one transponder unit can withstand higher strains such as, for example, when the security document is carried in a wallet or in rear trousers pockets, as well as strains due to accidental washing or stamping with a metal stamp or the like.

According to an advantageous embodiment of the invention, it is provided that the edge of the laminated layers—after complete encompassing of the at least one security cambric and the at least one transponder unit—will be stamped to an end format, cut, or cut to size by other separating methods. Thus, a uniform size for a book page can be created which corresponds with additional inside pages which are formed without laminated layers.

The at least one security cambric and the at least one transponder unit or, respectively, their functions are integrated in one layer according to an advantageous embodiment of the invention. Thus, a security document can be produced which comprises a very thin structure. Due to the compact and at least partial integration, additional security characteristics can be developed, thus rendering manipulation more difficult.

According to another advantageous embodiment of the invention, it is provided that at least one transponder unit is applied on the at least one security cambric and that this composite is provided with laminated layers. It is thus rendered possible that—with a personalization page designed as a security cambric—a transponder unit is provided on a front or rear side which is laminated in, together with the personalization page. By means of this unit in which the transponder unit comprises in particular personalization data of the personalization page, a unit will be created which is particularly difficult to forge.

Alternatively, it can also be provided that one transponder unit is applied on one inside page of a book-type security document—such as a passport book for example—and that this inside page and transponder unit will be fully encompassed and sheathed by the laminated layers. These inside pages advantageously comprise at least one security characteristic which can also be stored in the transponder unit.

The two aforementioned embodiments ensure that any delamination or splitting of the security cambric and/or the transponder unit will be rendered impossible.

According to another advantageous embodiment of the invention, it is provided that a projection is created on the laminated layers on one side and the laminated composite is sewn into a book block in the area of the projection. Thus, the at least one security cambric and the at least one transponder unit provided in a sheathing of laminated layers can be introduced in the production of the book-type security document. This further renders any manipulation more difficult.

According to another alternative embodiment of the invention, it is provided that—through the laminated layers—a double page for a book-type security document will be formed and, on one side, at least one security cambric is introduced and, on the other side, at least one transponder unit will be sheathed. This advantageous design has the advantage that—in the folding area of the double page—a stay or a seam area will be formed, via which the double page will be sewn in or fastened in the book block for the production of the security document. This embodiment provides the advantage that a minor thickness of the laminated layer sheath will be created, with the at least one security cambric as well as the at least one transponder unit being provided in a protective sheathing through the laminated layers.

Alternatively, it can be provided that the double page is designed separately and that a projection is provided on one side each of the separately designed double page, said projection being provided for sewing into a book block or for working into a book-type security document.

The laminated layers are advantageously glued or welded with each other under pressure and/or temperature. Thus, with the use of adhesive or the like, a fixation to each other can be provided at the same time between the at least one security cambric and the at least one transponder unit. During or before the laminated layers are laminated on, a casting compound can also be advantageously introduced for the fixation of an IC module or a chip module so that the module will be fixed and protected in the casting compound. This applies in particular for the lamination process. Another advantageous embodiment can be provided by the use of a double-sided adhesive tape which can be laminated, for example, with reactive adhesives.

According to another advantageous embodiment of the invention, it is provided that the at least one transponder unit will be personalized after the production of the laminated layer sheath. This personalization can be provided, for example, by the storage of biometric characteristics of the owner of the security document. With an algorithm, for example, a hash value on the basis of the ICAO line and/or the personalization data can be deposited on the IC module. Thus, at a later point in time, it can be checked whether the individual security characteristics and components correctly belong together, and any forgery can be reliably detected. In the same manner, an indelible numeric or alphanumeric and biunique value—existing in the IC module and being provided, for example, in the so-called write-once memory and/or in ROM memory and/or other written memories—is to be advantageously deposited visually discernibly on the security cambric, especially the personalization page.

According to another advantageous embodiment of the invention, it is provided that—after the production of a laminated layer sheath which encompasses at least one security cambric and at least one transponder unit—at least one security characteristic will be provided in the laminated layer sheath, in particular, lasering or a hole matrix. The additional introduction of security characteristics during the production of the security document will increase the forgery proof quality.

According to an advantageous embodiment of the invention for the production of a security document, the transponder unit comprises a chip module with an integrated antenna which is applied on a security cambric or a laminated layer by means of a tape automatic bonding process (TAB). This will ensure economic production. The advantage of this transponder unit is also its ruggedness and easier verifiability.

According to another advantageous embodiment of the invention, it is provided that the transponder unit comprises a chip module, wherein ICs are fastened on so-called interposer or, respectively, contact elements, with two contact elements then being electrically conductively connected with contact ends of the antenna coil. This can provide for another simple production of a transponder unit with contactless storage for biometric data and additional security characteristics.

Another advantageous embodiment of the transponder unit provides that an un-housed IC module will be contacted—using flip chip contacting—with an antenna provided in the laminated layer. This embodiment provides the advantage of a flat-built transponder unit.

According to another advantageous and alternative embodiment of the invention, it is provided that a transponder unit comprises a chip module with contacting for an external coil or antenna, the coil or the antenna being produced by means of screen printing, by means of conductive and polymer materials such as, for example, silver-filled pastes, through thin copper or aluminum or gold wires, through ultrasound by means of sonotrode technology, through etched coils on the basis of copper, aluminum or other conductive materials, through inkjet technology with a correspondingly conductive ink. Depending on the number of transponder units to be produced, one or the other embodiment can result in an economic production of the security document.

Advantageously, the IC module is fastened and protected by means of a casting compound. This introduction achieves the advantage that the IC module is protected against environmental influences, especially against mechanical pressure. Moreover, fixation in a desired position to the security cambric can be provided. For example, a chip module can be positioned close to a passport photo or it can be on the edge of a personalization page or inside page to provide a maximum area for the antenna coils.

Advantageously, the laminated layer sheath comprises at least one transparent laminated layer which is applied for lamination so that a security cambric is accepted visibly and in a machine-readable form.

The book-type security document according to the invention—especially a travel document, according to any one of the preceding claims in a laminated layer sheath encompassing the at least one transponder unit and the at least one security cambric—has the advantage that the at least one security cambric and the at least one transponder unit are fully encompassed, and thus protected, by at least one laminated layer. The laminated layer can be designed as a sheath or as a pocket in which the at least one security cambric—for example in the form of a personalization page or an inside page provided with security characteristics—as well as at least one transponder unit are arranged and encompassed. Due to the preferably at least partial congruence of the security characteristics on the at least one security cambric and the at least one transponder unit, the forgery proof quality is considerably increased. Moreover, any splitting of the laminated layer to replace the at least one transponder unit and/or the at least one security cambric will result in a destruction of the entire composite. Due to this arrangement according to the invention, a personalization page, for example, with the characteristics introduced visually, photographically, by printing technology and/or laser technology can be duplicated and deposited contactlessly in the memory in the at least one transponder unit. Due to this redundancy of the security characteristics, manipulation will be rendered considerably more difficult.

According to another advantageous embodiment of the security document, it is provided that the at least one security cambric and the at least one transponder unit are each designed smaller than the end format of one page of a book block. This will ensure that the laminated layers form an exterior circumferential marginal area which exclusively consists of the at least one upper and lower laminated layer which are advantageously welded together to one unit in the marginal area and cannot be separated individually.

According to another advantageous embodiment of the security document, it is provided that the at least one laminated layer is designed as a covering film or as an overlay film. Depending on the cases of application and utilization, not only can at least one covering layer be applied but also at least one overlay layer. For example, a covering and/or overlay layer can be sectionally applied for the production of a uniform layer thickness of the laminated layer sheath so that uneven thicknesses by the chip module can be balanced out and the completed composite will comprise a uniform overall thickness.

Further advantageous embodiments and developments of the invention are specified in the additional claims.

In the following, the invention as well as additional advantageous embodiments and developments of the same will be described and explained in detail on the basis of the examples presented in the drawings. The features which can be gathered from the description and the drawings can be used individually by themselves or in a plurality in any combination according to the invention. It is shown in:

FIG. 5b a diagrammatic sectional view (partial section) of an alternative embodiment to FIG. 5a;

Figure 1:
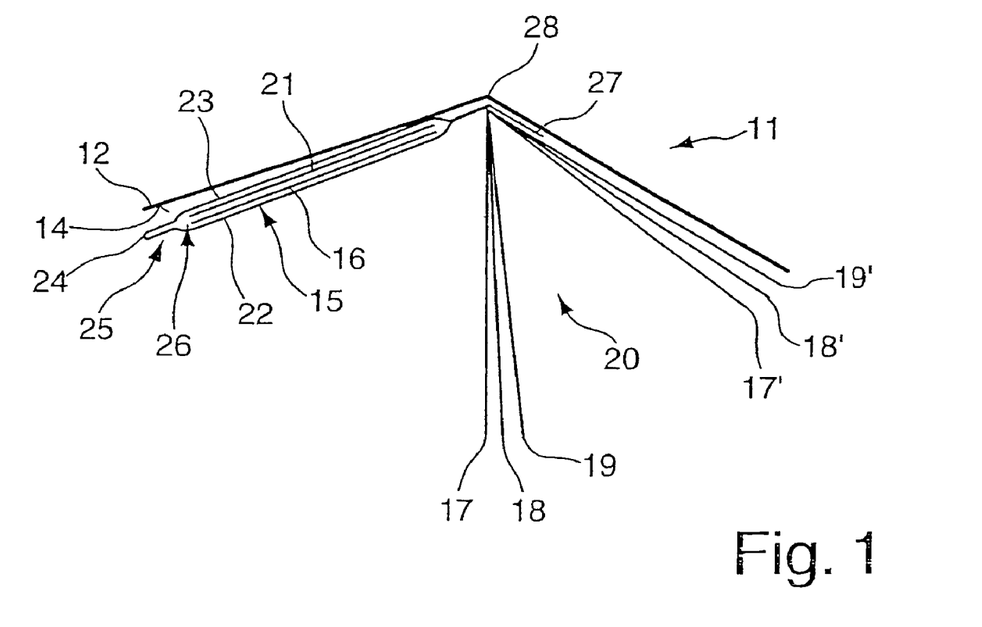
FIG. 1 a diagrammatic side view of a security document according to the invention, in opened up condition.

FIG. 1 presents diagrammatically a security document 11 in an opened up view. This security document 11 is preferably a travel document or a passport book. This security document 11 comprises a book lining 12, such as, for example, a book cover of a book on the outside as a reinforcing element. On the inside, an end paper 14 is provided. This end paper 14 surrounds the book lining which encompasses a book cover. The security document 11 comprises at least one security cambric 15 in the form of at least one personalization page 16. Advantageously, at least one additional security cambric is provided as inside pages 17, 18 and 19. The inside pages 17, 18 and 19 are designed, for example, as double pages 17', 18', 19' and, during the production of the security document 11, they are sewn with each other in the fold area with the personalization page to a book block 20.

The security cambric 15 comprises, for example, on one rear side a transponder unit 21, with the security cambric 15 and the transponder unit 21 each being surrounded by one upper and one lower laminated layer 22, 23. These laminated layers 22, 23 fully encompass the security cambric 15 and the transponder unit 21 and comprise a circumferential and closed edge 24, as also presented in detail, for example in the FIGS. 2 and 3. The laminated layers 22, 23 form a pocket or a sheath 25 around a composite 26 which can consist of at least one security cambric 15—which may comprise several layers—and at least one transponder unit 21. On one side of the laminated layer sheath 25, a projection 27 is formed in a size of 10 to 13 mm, for example. This projection 27 essentially contributes to the stability and fastening of a seam 28 by means of which the inside pages 17, 18, 19 are also fixed to a book block 20 together with the laminated layer sheath 25. Alternatively, it can also be provided that the security cambric 15 and the transponder unit 21 are integrated in one layer or built up and formed by the combination of several layers and/or partial layers. The following forms of embodiment apply for the aforementioned combination possibilities, as far as they are suitable.

Figure 2:
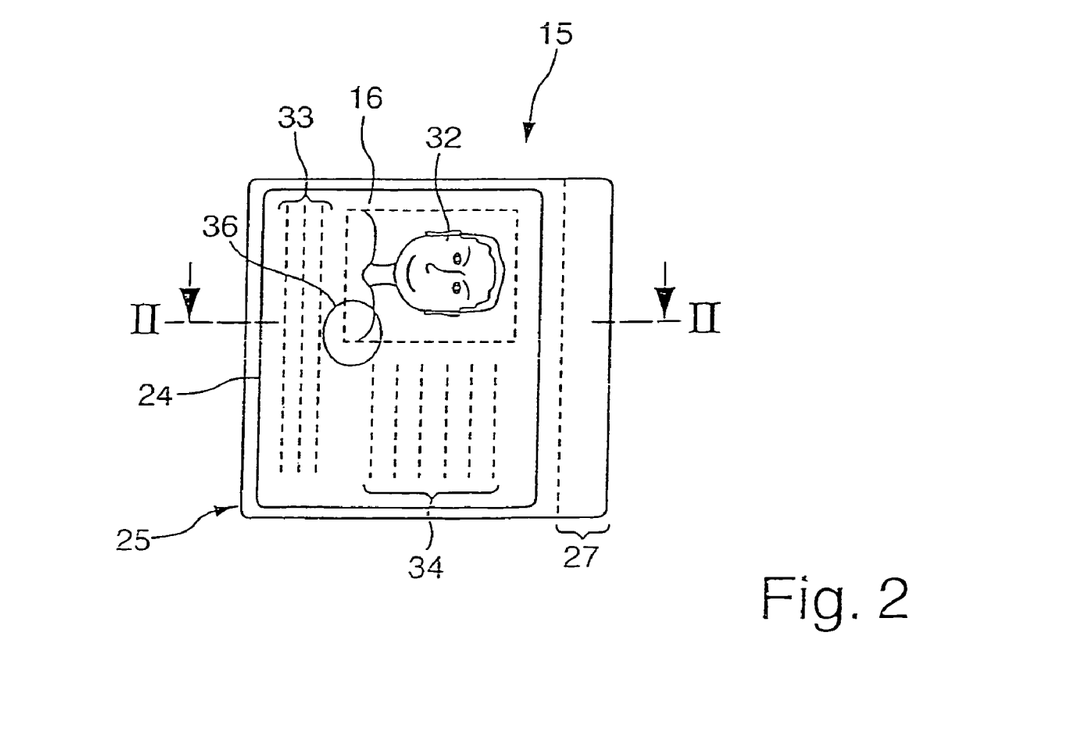
FIG. 2 a diagrammatic top view of a security cambric with a transponder unit in a laminated layer sheath.

FIG. 2 is a diagrammatic presentation of a top view of a personalization page 16 which is fully encompassed by laminated layers 22, 23. The front personalization page can be designed, for example, according to ICAO standards and comprises a photo 32 of the owner of the document, an OCR machine readable ICAO line 33, personalization data 34 and a diffractive structure 36—over the full surface or in elements as in the exemplary embodiment—which can be provided on the surface or on the inside, as well as a number of additional security characteristics or elements not drawn in. The contour of the personalization page 16 is diagrammatically presented which is preferably produced of a security paper and additional security characteristics. This contour is dimensioned such that an edge 24 of a few millimeters surrounds the personalization page and also the at least one transponder unit 21 and such that the laminated layer sheath 25 does not project versus a book lining 12.

Figure 3:
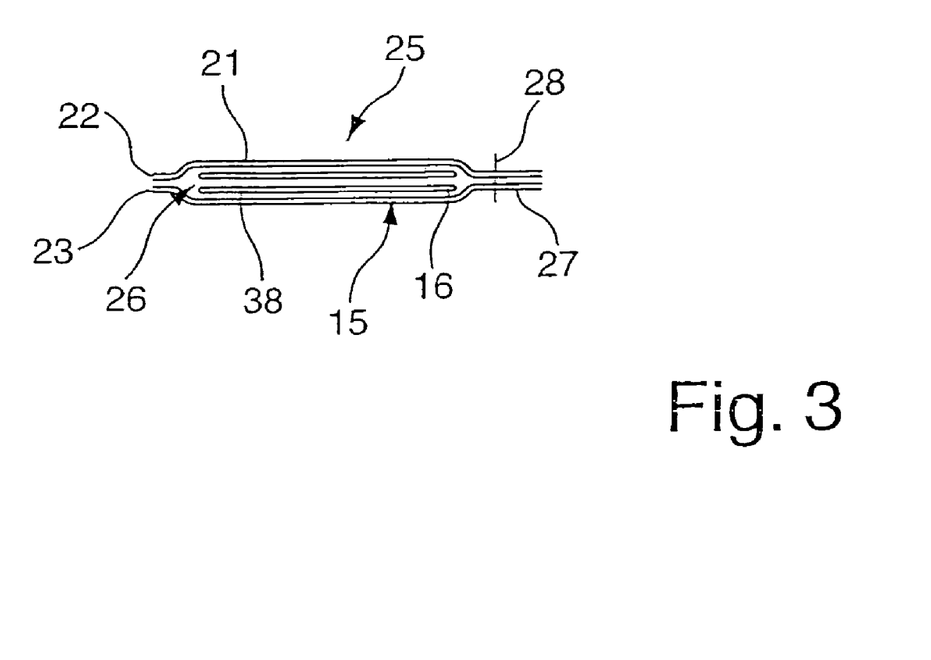
FIG. 3 a diagrammatic sectional view along the line II-II in FIG. 2.

FIG. 3 presents a diagrammatic sectional view along the line II-II in FIG. 2 of a laminated composite 26. The personalization page 16 is advantageously equivalent to the size of the transponder unit 21. Basically, the transponder unit 21 can assume nearly any random forms and positions. However, an antenna 38 or, respectively, a coil of the transponder unit 21 must comprise a geometry or, respectively, a surface or a number of windings so that a corresponding quality for the desired or required reading distance is given. The operating frequency is 13.56 MHz, for example, and allows the usual reading performance. The presented embodiment has the advantage that—especially in the area of the spine of the book or, respectively, the seam 28—a relatively low thickness of the laminated layer sheath 25 is achieved so that the sewing process can be accordingly simply performed and, with a suitable selection of the laminated layers 22, 23, the requirements on bending frequency and stability as well as foldability will be met.

The laminated layers 22, 23 can consist of a single laminated layer on each side or of multi-layered films, such as, for example, a combination of PE and PET or, respectively, PET-like materials with a high surface stability. Moreover, other thermoplastic films or sandwich-type film combinations can be used, such as, for example, PVC, ABS, PET-G, PET, PP, PA, teslin, PC, or the like.

Figure 4:
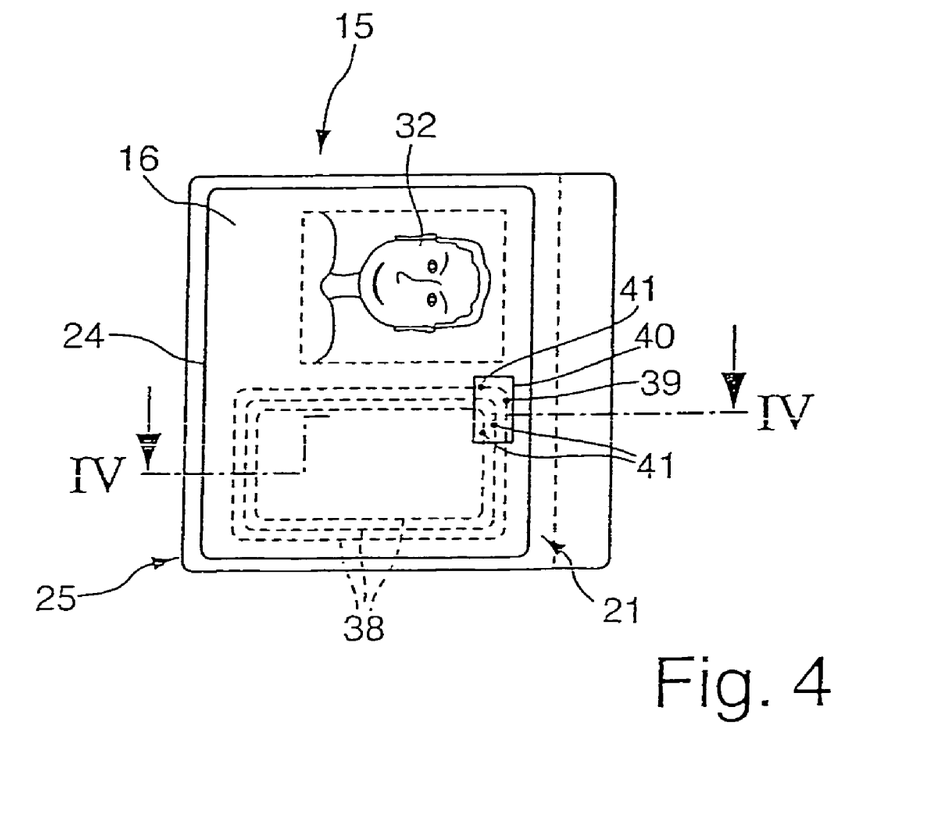
FIG. 4 a diagrammatic top view in a detailed presentation of a security cambric with a transponder unit in a laminated layer sheath.

FIG. 4 presents a diagrammatic top view onto a laminated composite 26 of a laminated layer sheath 25 in partial section. In this partial section, the arrangement of a transponder unit 21 to a personalization page is presented. The transponder unit 21 comprises at least one antenna 38 and one chip module 39 which are contacted via electrical connections 41 to each other, preferably on an interposer 40. The transponder unit 21 is arranged, for example, next to the personalization photo 31. The position of the antenna 38 can be provided at random and optionally even in the entire area of the security cambric 15.

Figure 5A:
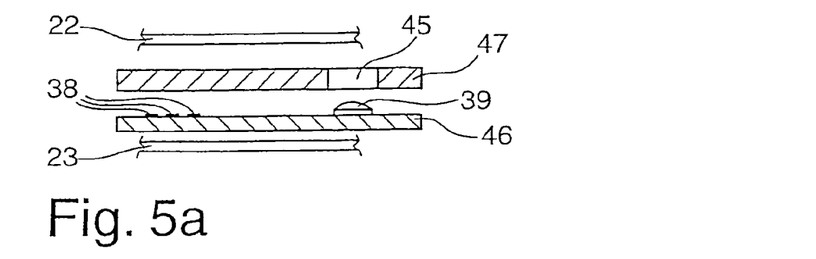
FIG. 5a a diagrammatic sectional view (partial section) of a laminated composite along the line IV-IV in FIG. 4.

FIG. 5a is a diagrammatic sectional presentation of the laminated composite 26 according to FIG. 4. A chip module 39 is applied on an antenna carrier film 46 so that an electrical contract between the chip module 39 and the antenna 38 and, respectively, its connections is given. Optionally, a cover film 47 can be applied or laminated onto the antenna carrier film 46, the cover film preferably comprising a recess 45 in the area of the chip module 39 so that the chip module 39 is leveled in and the connections of the antenna 38 are mechanically protected at the same time. In thickness, the chip modules 39 range between 150 to 250 μm, ranging especially between 180 to 200 μm, and can be principally thinned. The usual antenna substrates for antenna carrier films 46 have a thickness of 6 to 500 μm, especially a thickness ranging between 30 and 120 μm, and can consist—depending on the production method and the required contacting methods of the chip module 39—of PET, PI, FR-4, aramide, PVC, PS, PE, PA, PP, PE, teslin, PC, and similar materials. The antenna coils 38 can be produced of enameled copper wire with an ultrasonic sonotrode laying technology, for example. Alternatively, the antenna coils 38, as air coils, can be laid into a corresponding recess and laminated. Moreover, the antenna coils 38 can be produced by screen printing by means of polymer and conductive pastes (additive flexible printed circuit board technology) or as flexible printed circuit boards with subtractive technique, as an etching method in copper or aluminum.

Figure 5B:
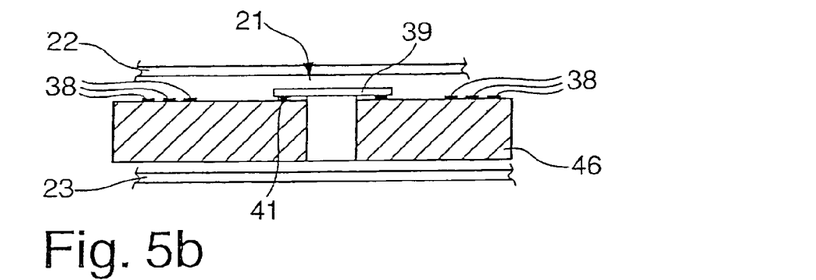

FIG. 5*b* is a diagrammatic sectional view of an alternative embodiment of FIG. 5*a*. A preferably transparent film—for example of PE or an equivalent material such as, for example, PET-G or PMMA—is designed as an antenna carrier film 46 or accepts at least the antenna 38. In a passage boring or punching of the preferably 100 to 500 μm thick layer, a chip module 39 is provided which can be contacted via contacts 41 on an upper side of the film. This composite 26 is encompassed by the laminated layers 22, 23.

Figure 6:
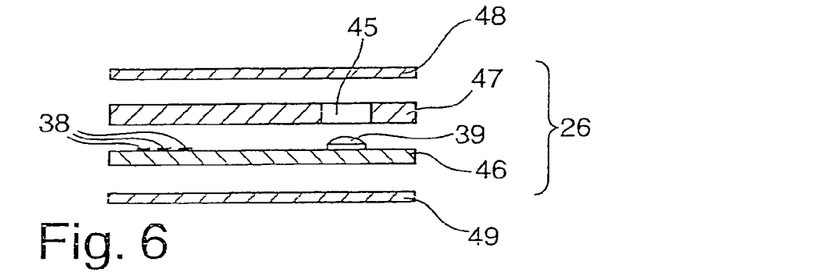
FIG. 6 a diagrammatic sectional view (partial section) of an alternative embodiment to FIG. 5.

FIG. 6 presents another alternative embodiment of a laminated composite 26. The transponder unit 21 is applied on an antenna carrier film 46. On the underside, an overlay film 49 is provided for example which, if necessary, can protect the printed picture on the antenna carrier film 46 and contributes overall to the stability of the composite 26. This overlay film 49 can also be provided instead of a laminated layer 22 or 23, or it can be done without so that the film 46 takes over the functions of the overlay film. On the opposite side, a cover film 47 is preferably provided with a recess 45 which is protected by another cover film 48 or an overlay film 49. The laminated layer structure can have different numbers of superposed films.

Figure 7:
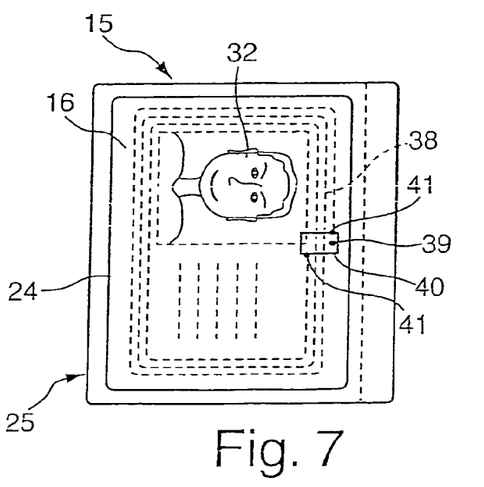
FIG. 7 a diagrammatic top view of a laminated composite with an alternative arrangement of a transponder unit.

FIG. 7 presents another diagrammatic top view of a laminated composite 26. This embodiment deviates from FIG. 4 insofar as the antennas 38 are provided in the outer marginal area of the personalization page 16. With a maximum number of windings, a maximum of communication reach can be achieved or, respectively, with a specified communication reach, a minimum of windings will be required.

Figure 8:
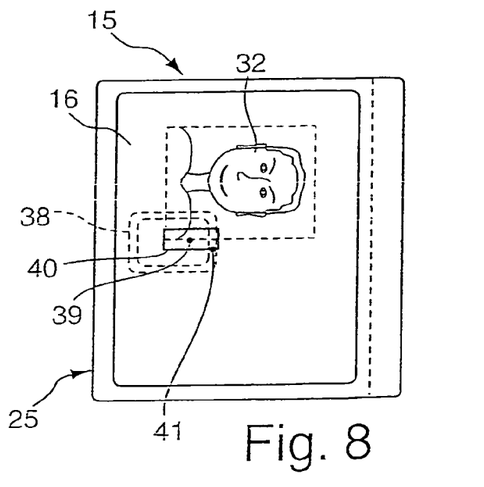
FIG. 8 a diagrammatic top view of a laminated composite with another alternative arrangement of a transponder unit.

FIG. 8 presents another alternative embodiment of a laminated layer sheath 25 to the FIGS. 4 and 5. This embodiment comprises a transponder unit 21 with a module-type minor variation of the embodiment of the antenna 38 and a chip module 39. With such small antenna geometries, the antenna 38 can be directly designed on the chip module 39, for example, by means of TAB technology. In this embodiment, the personalization page 16 can comprise, for example, a recess into which the module-type minor variation of the embodiment is inserted. Additionally, on the front and/or the rear side of the personalization page 16, a cover layer and/or an overlay layer can be provided which is thinned or perforated in design in the area of the transponder unit 21.

Figure 9:
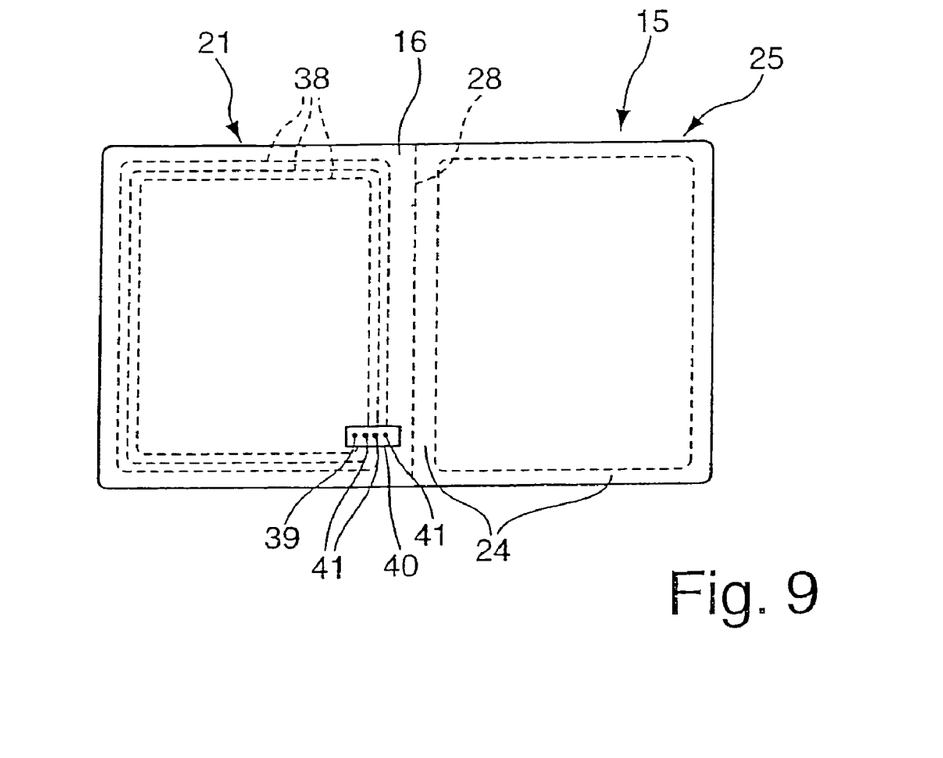
FIG. 9 a diagrammatic view of a security cambric and a transponder unit with a laminated layer sheath as a double page.

FIG. 9 presents another alternative embodiment of a laminated layer sheath 25. This is designed as a double page, and, for example, on a left side, the transponder unit 21 being protected by the laminated layers 22, 23 and, on the right side, a personalization page 16 being surrounded by laminated layers 22, 23. In the fold area, a perforation or grooving is preferably provided which is introduced mechanically or thermally, to provide a seam 28 during the production of the security document 11 in a simplified form. This embodiment enables a separate arrangement of at least one security cambric 15 and at least one transponder unit 21 in a common laminated layer sheath 25.

Figure 10:
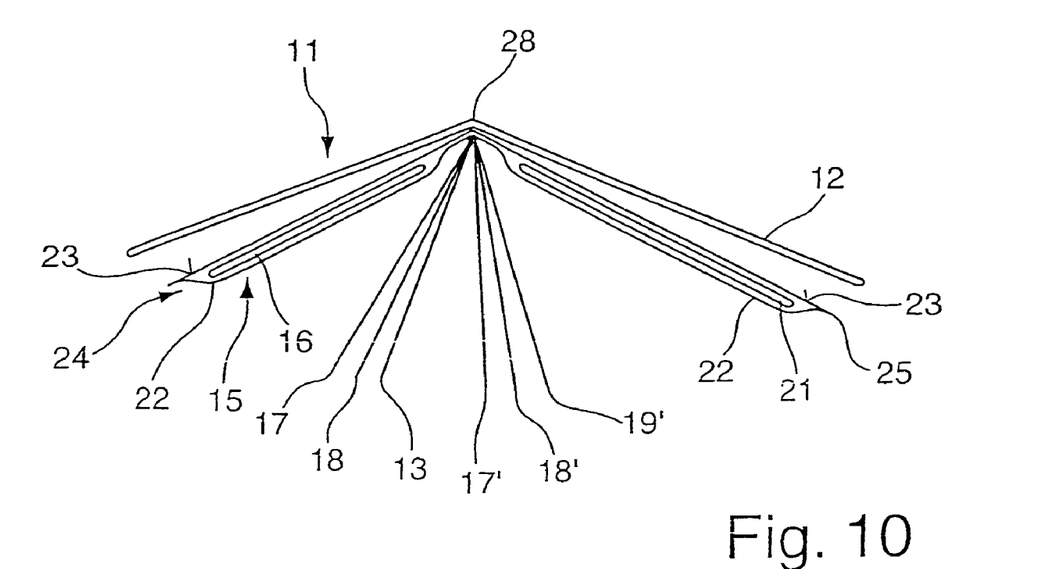
FIG. 10 a diagrammatic side view of the embodiment according to FIG. 9 in opened up condition.

FIG. 10 provides the laminated layer sheath 25 according to FIG. 9 in a security document 11 which is presented in an opened up side view. Additionally to the double page, further inside pages 17, 18 and 19 can be provided via the seam 28 for the laminated layer sheath 25. Furthermore, it can be provided that the antenna carrier film 46 extends over the entire double page, with the fold area being designed such that secure plating-through is provided despite bending.

Figure 11:
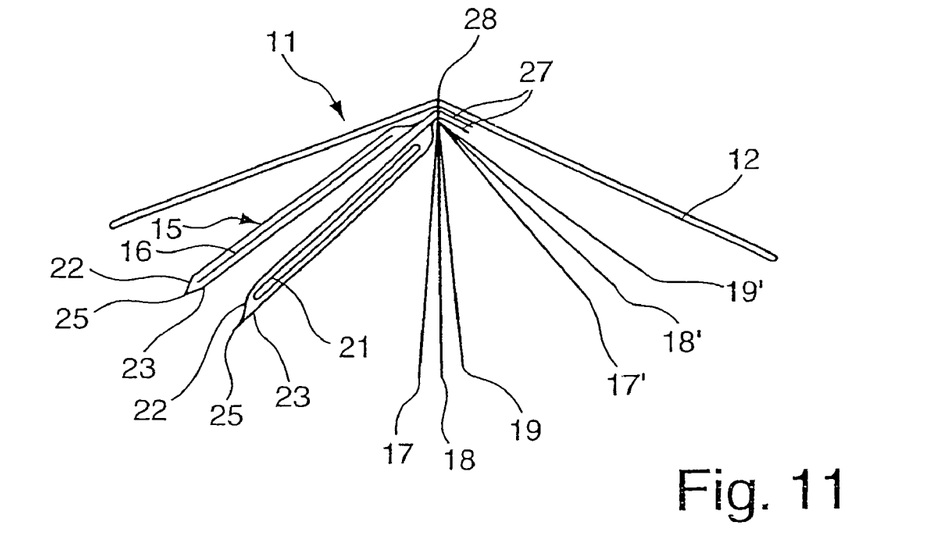
FIG. 11 a diagrammatic side view of another alternative embodiment of the book-type security document in opened up condition.

FIG. 11 presents an alternative embodiment of FIG. 10. Instead of an embodiment of a laminated composite 26, for example, two laminated layer sheathes 25 are sewn with a projection 27 into a security document 11, with a first laminated layer sheath 25 fully encompassing a personalization page 16 and the at least one other laminated layer sheath 25 encompassing the transponder unit 21. The front and rear side of the personalization page 16 is thus fully accessible. This embodiment provides that, for example, one laminated layer sheath 25 with one personalization page 16 or one inside page 17 can be separately produced, as well as one laminated layer sheath 25 with one transponder unit 21 to join them in the production of the security document 11 and—by storing the personalization data in the transponder unit 21—providing them with an increased forgery proof quality.

Figure 12:
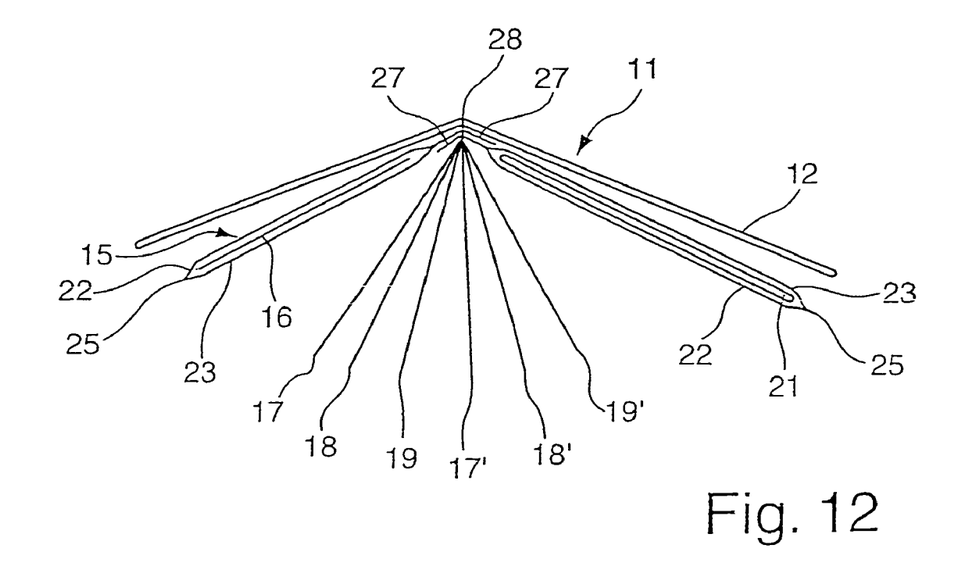
FIG. 12 a diagrammatic side view of another alternative embodiment of a book-type security document in opened up condition.

The embodiment of the security document 11 presented in FIG. 12 deviates from the embodiment presented in FIG. 11 such that the laminated layer sheath 25 comprising the personalization page 16 and/or one inside page 17, 18, 19 is arranged opposite the laminated layer sheath 25 comprising the at least one transponder unit 21.

Figure 13:
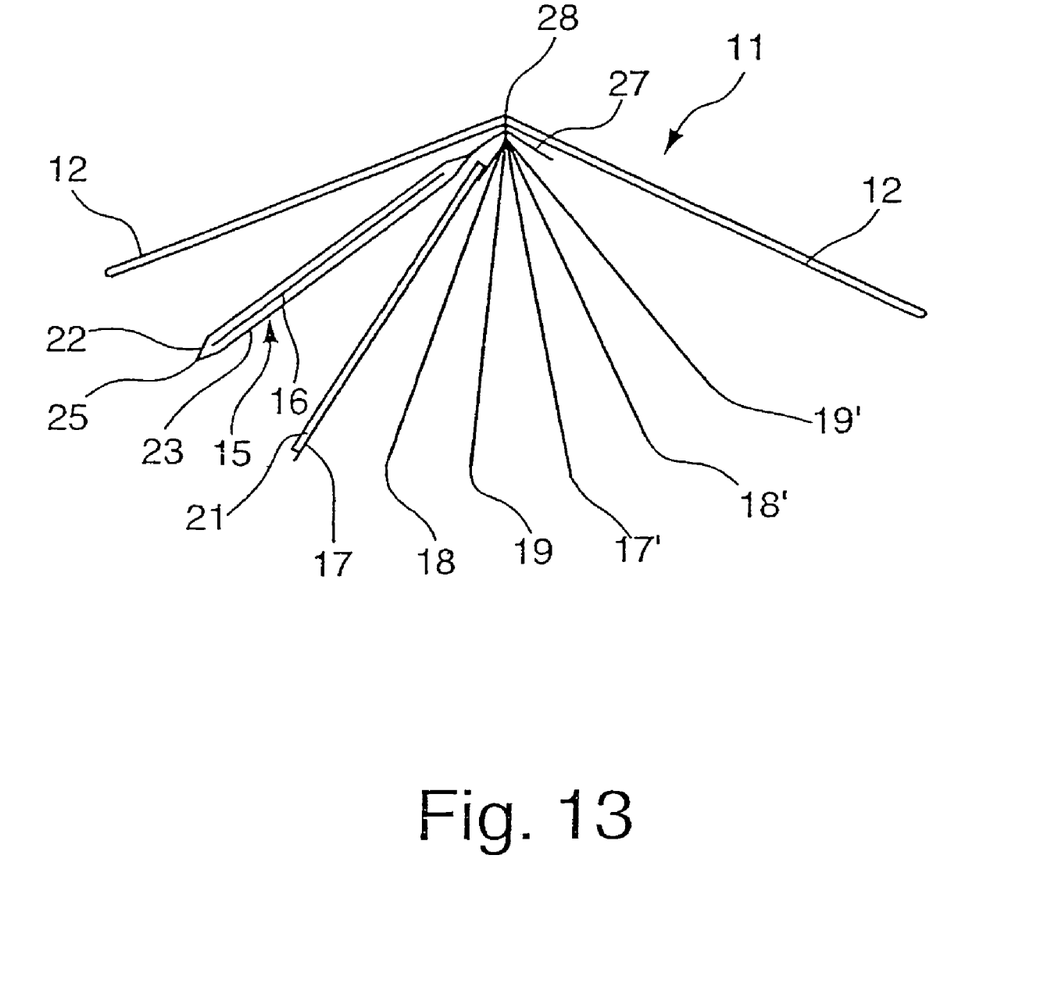
FIG. 13 a diagrammatic side view of another alternative embodiment of a book-type security document in opened up condition.

FIG. 13 presents another alternative embodiment of a security document 11 in the side view in an opened up condition. The transponder unit 21 is provided on one inside page 17, 18 or 19 in the form of a sticker. This sticker is provided, for example, as a visa, as an extension of passports without a transponder unit, as a transponder unit for savings books and similar security documents. This embodiment has the advantage that the transponder unit 21 according to FIG. 6 is subsequently applied on the inside page 17, 18 or 19 and an additional increase in forgery proof quality will be provided by the programming and storage of biometric characteristics and other personal-specific characteristics. Also, for example, after application of the sticker or the visa, lasering can be provided so that the page 17, 18 or 19 provided with the transponder unit 21 is also personalized. Fastening can be by means of cold adhesive or melt adhesive, or reactive and partially reactive adhesive systems can be used.

The transponder unit 21 applied on the inside page can be cut or punched respectively, jointly with the inside at the end of the production process. In this embodiment, the transponder unit 21 is terminated shortly before the seam 28 or, respectively, the spine of the book so that—on all three other sides—a full-surface composite is provided with the inside page 17, 18 or 19, and bordering will only be performed at the end of the production process.

When using a transponder unit 21 which is sheathed in a laminated layer sheath 25 or in a laminate pocket which consists of at least two laminated layers 22, 23, a shielding element can be advantageously provided in the security document 11. The shielding element is understood as an element which—in closed condition of the security document 11—prevents a wireless communication with the transponder unit 21; however, it will enable communication in opened up condition. In particular, electronically conductive elements will be provided as shielding elements—such as electrically conducting pastes by printing technology, or thin laminated foils of aluminum, copper, steel or a wire fabric in a book cover and/or in a security cambric adjacent to the transponder unit 21. Principally, the shielding element need not be executed over the full surface but can also be line-like, in the form of a raster or the like so that there will be interference with RF radiation. The shielding element is arranged particularly close to the transponder unit 21; thus, particularly good shielding is provided through short circuits of the electromagnetic wave.

The production of the laminated layer sheath 25 which comprises at least one security cambric 15 and one transponder unit 21 can be provided as follows:

Firstly, the security cambric 15 is produced which consists, for example, of paper, plastic, or the like. This security cambric is produced with security characteristics such as a security print, visual elements, photographic elements, security characteristics produced by printing technology as well as characteristics applied by laser technology.

The transponder unit 21 consists of a chip module 39 and an antenna 38. Depending on the structure of the laminated layer sheath 25, a chip module 39 can be provided with an external antenna 38, as well as a chip module 39 with an integrated antenna 38. With an un-housed chip module 39, a so-called flip chip contacting will be preferably selected in which the un-housed chip module 39 is directly applied to the antenna connections. The antenna substrate can be optionally designed and produced. The chip module 39 is preferably protected by means of a corresponding casting compound. If required or desired, this finished element can be directly fastened on a security cambric 15 by means of an adhesion mediator, with the chip being optionally provided in a blanking 45 in the security cambric 15 or a cover film 47, 48 so that the increase by the chip or, respectively, the casting compound is provided in this blanking 45, or the antenna substrate can be reinforced with an additional laminate such that the chip with the casting compound is laminated largely flush or preferably flush and will thus be mounted flush on the personalization page.

The transponder unit 21 can also be realized by a chip module 39 in which the ICs are fastened on so-called interposer or, respectively, contact elements 40 whose two contact elements will then be connected, electrically conductively, with the contact ends of the antenna coil 38. This IC assembly can also be provided by means of flip chip technology as well as by means of the conventional bond technology.

In the design of a transponder unit 21 by means of a chip module 39 with an integrated antenna 38, a particularly efficient and economical process can be performed with the use of the so-called TAB process (tape automatic bonding). In case of the integration of the antenna 38 in the form of a coil or a dipole or a folded dipole, it can be economically produced in fine conductor etching on a thin FR-4 layer or a polyamide substrate or, respectively, principally also on a polyester or poly carbonate or polyamide or PVC or ABS substrate.

The transponder unit 21 can be connected in a preferred embodiment with the security cambric 15. In an alternative embodiment, the transponder unit 21 can be arranged adjacent to a security cambric 15, such as, for example, by the design of a double page, and the respectively separate arrangement can also be provided on one page.

The security cambric 15 and the transponder unit 21 are designed preferably smaller than the end format of a book block. A laminated layer 22, 23 is applied on at least one side of the transponder unit 21 and the at least one security cambric 15, with the at least one security cambric 15 and the at least one transponder unit 21 being closed. Subsequently thereto or simultaneously, a circumferential edge 24 is formed which is produced by lamination under pressure and temperature, for example, in a roll laminator or in a lamination press. In another work step, the laminated sheath 25 is cut or punched to an end format.

The laminated sheath 25 is introduced into a book block 20 or into a security document 11 and preferably sewn in. After their introduction, additional personalization characteristics can be provided in the laminated sheath 25 by hole matrix or by lasering.

The above described characteristics can be combined at random with each other and are each inventive on their own.

The invention claimed is:

1. Method for the production of a book-type security document having a book cover on an outside of the book-type security document, which is reinforced, and having at least one security cambric and at least one transponder unit, said method comprising the steps of:

applying at least one first laminated layer on at least one side of the at least one security cambric and on at least one side of the at least one transponder unit, wherein the at least one transponder unit comprises a chip module wherein ICs are fastened on contact elements by means of flip chip technology or by means of the conventional bonding technology, with the contact elements being electrically conductively connected with contact ends of the antenna, applying at least one second laminated layer on at least an opposite side of the at least one security cambric, wherein the at least one security cambric and the at least one transponder unit are fully encompassed by the laminated layers and a circumferential, closed edge is provided by the laminated layers and whereby a laminated layer sheath is formed, introducing the laminated layer sheath into a book block, a projection being produced on at least one longitudinal side of the laminated layer sheath, and sewing the laminated layer sheath into the book block in the area of the projection.

2. Method according to claim 1, characterized in that, after complete encompassing of the at least one security cambric and the at least one transponder unit, the edge of the laminated layers is stamped to an end format, cut, or cut to size by laser cutting.

3. Method according to claim 1, characterized in that the at least one security cambric and the at least one transponder unit are combined in one layer or that a composite is formed by several layers.

4. Method according to claim 1, characterized in that at least one transponder unit is applied onto the at least one security cambric, and a composite is formed which is encompassed by the laminated layers.

5. Method according to claim 1, characterized in that a double page for a book block is formed by the laminated layer sheath and on one side of the double page, at least one security cambric is introduced and on the adjacent side of the double page, at least one transponder unit is introduced.

6. Method according to claim 5, characterized in that in a folding area of the double page, a stay, a groove or a perforation is formed, and the double page is sewn into a book block in the area of the stay, the groove or the perforation.

7. Method according to claim 1, characterized in that the laminated layers are glued, pressed, welded or combined with each other at least under pressure or temperature.

8. Method according to claim 1, characterized in that the at least one transponder unit is personalized after the production of the laminated layer sheath.

9. Method according to claim 1, characterized in that the at least one transponder unit is personalized with an algorithm forming a hash value on the basis of the ICAO line and/or of personalization data.

10. Method according to claim 1, characterized in that, after the production of the laminated layer sheath, at least one security characteristic is provided in the laminated layer sheath.

11. Method according to claim 1, characterized in that, during or after the production of a security document, a value permanently deposited in the at least one transponder unit is introduced as a security characteristic.

12. Method according to claim 1, characterized in that the laminated layers are produced of plastic films selected from the group consisting of PVC, ABS, PET-G, PET, PE, PP, PA, teslin, PC, and of sandwich-type film combinations of the aforementioned materials.

13. Method for the production of a book-type security document having a book cover on an outside of the book-type security document, which is reinforced, and having at least one security cambric and at least one transponder unit, said method comprising the steps of:
applying at least one first laminated layer on at least one side of the at least one security cambric and on at least one side of the at least one transponder unit, wherein the at least one transponder unit comprises a chip module with an integrated antenna which is applied by means of a tape automatic bonding process (TAB) onto at least one security cambric or one laminated layer,
applying at least one second laminated layer on at least an opposite side of the at least one security cambric, wherein the at least one security cambric and the at least one transponder unit are fully encompassed by the laminated layers and a circumferential, closed edge is provided by the laminated layers and whereby a laminated layer sheath is formed,
introducing the laminated layer sheath into a book block, a projection being produced on at least one longitudinal side of the laminated layer sheath, and
sewing the laminated layer sheath into the book block in the area of the projection.

14. Method for the production of a book-type security document having a book cover on an outside of the book-type security document, which is reinforced, and having at least one security cambric and at least one transponder unit, said method comprising the steps of:
applying at least one first laminated layer on at least one side of the at least one security cambric and on at least one side of the at least one transponder unit, wherein an un-housed IC is contacted by means of flip chip contacting directly on antenna connections of an antenna designed in a laminated layer, for the formation of at least one transponder unit,
applying at least one second laminated layer on at least an opposite side of the at least one security cambric, wherein the at least one security cambric and the at least one transponder unit are fully encompassed by the laminated layers and a circumferential, closed edge is provided by the laminated layers and whereby a laminated layer sheath is formed,
introducing the laminated layer sheath into a book block, a projection being produced on at least one longitudinal side of the laminated layer sheath, and
sewing the laminated layer sheath into the book block in the area of the projection.

15. Method according to claim 1, characterized in that the at least one transponder unit comprises a chip module for contacting an external coil or antenna, with the coil or antenna being produced through screen printing by means of polymer and conductive pastes, through enamel-insulated metallic wires, especially by means of ultrasonic sonotrode laying technique, through insertion or lamination of an air coil into corresponding recesses, through flexible printed circuit boards in subtractive technique, through an etching technique in metallic surfaces or through an inkjet technique with a conductive medium.

16. Method according to claim 13, characterized in that the chip module is fastened by means of a casting compound between the at least two laminated layers.

17. Method according to claim 1, characterized in that a chip module with integrated antenna is directly applied on a security cambric and the thickness of the at least one laminated layer is locally thinned or punched out in the area of the chip module.

18. Method according to claim 1, characterized in that the at least one laminated layer is processed as a transparent film for the production of the laminated layer sheath.

* * * * *